UNITED STATES PATENT OFFICE 2,351,120

POLYMERIZATION OF ETHYLENIC MATERIALS

William Edward Hanford, Wilmington, Del., assignor to E. I. du Pont de Nemours & Company, Wilmington, Del., a corporation of Delaware No Drawing. Application August 6, 1942,
Serial No. 453,851

9 Claims. (Cl. 260—67)

This invention relates to new compositions of matter formed by the reaction of ethylene/carbon monoxide polymers with an aldehyde substance alone, or in conjunction with a urea, phenol, or amine.

In co-pending application Serial No. 449,765, filed July 4, 1942, there is described and claimed the production of solid polymerization products by polymerizing carbon monoxide with polymerizable organic compounds containing ethylenic unsaturation in the presence of per-oxy compound catalysts.

It has now been found, according to the present invention, that the solid polymers obtained according to the aforementioned copending application may be reacted with an aldehyde substance alone, or in conjunction with a urea, phenol, or an amine, to give valuable synthetic resins.

In the practice of this invention a suitable reaction vessel, equipped with a reflux condenser and with means for agitating the reactants, is charged with the ethylene/carbon monoxide polymer, aldehyde substance alone or admixed with a urea, phenol, or amine, a non-polymerizable liquid reaction medium, and an alkaline catalyst and the mixture heated with agitation until the desired degree of reaction has been attained.

The expression "aldehyde substance" refers to compounds having the grouping

and compounds which yield substances having such a grouping when treated catalytically or thermally. Among such products are, formalin, paraformaldehyde, trioxane (alpha-trioxymethylene), hexamethylene tetramine, formals, acetaldehyde, propionaldehyde, benzaldehyde and furfuraldehyde.

The term "phenol" is used to refer to compounds of the general formula R.X.H. wherein R is an aryl radical and X is oxygen or sulfur. Examples of suitable phenols are phenol, cresol, xylenols, thymol, resorcinol, thiophenol, thiocresol, and the like.

The term "urea" as used herein refers to urea itself and includes urea derivatives containing at least one of the original amino hydrogens on each amino group unsubstituted. In place of urea there can be used thiourea or melamine and in general compounds of the type formula RNH.C.R₁NHR₂, wherein R₁ is oxygen, nitrogen or sulfur and R and R₂ are both hydrogen or both alkyl, e. g., methyl, ethyl, propyl, dodecyl, aralkyl, e. g., benzyl; aryl, e. g., phenyl, or tolyl; or cycloalkyl, e. g., cyclohexyl; or R is hydrogen and R₂ any one of the aforementioned radicals.

By "an amine" is meant compounds of the general formula RNH.R₁, wherein R and R₁ are both alkyl radicals such as methyl, ethyl, butyl, dodecyl or aryl radicals such as phenyl or tolyl, or one is hydrogen and the other an alkyl or aryl radical, or one is an alkyl radical and the other an aryl radical, as indicated above.

The examples which follow illustrate the practice of this invention and demonstrate operable conditions. Parts are by weight, unless otherwise specified.

Example I

A reaction vessel equipped with a mechanical stirrer and a return condenser is charged with 10 parts of an ethylene/carbon monoxide polymer having a $C_2H_4/CO$ mole ratio of 2.3/1, 5 parts of potassium carbonate, 150 parts by volume of 37% formalin, and 50 parts by volume of ethanol, and the mixture refluxed with agitation for 10 hours. The product, isolated by steam distillation, followed by filtration and drying, is a spongy solid containing 61.6% carbon and 9.1% hydrogen, which corresponds to the introduction of about 2 formaldehyde units per ethylene/Co polymer unit. It is soluble in pyridine, acetic acid, dioxane, and ethanol and insoluble in benzene, toluene, and chloroform.

Example II

A reaction vessel equipped with a mechanical stirrer and a return condenser is charged with 20 parts of an ethylene/carbon monoxide polymer having a $C_2H_4/CO$ mole ratio of 2.5/1, 10 parts of potassium carbonate, 500 parts by volume of 37% formalin, and 100 parts by volume of ethanol, and heated with agitation, at 70° to 75° C. for 96 hours. The product is isolated by steam distillation, followed by filtration and drying. There is thus obtained 21.9 parts of a hard, insoluble, and infusible material containing 59.8% carbon and 8.2% hydrogen, which corresponds to the introduction of about two hydroxymethyl groups per polymer unit.

Example III

A reaction vessel equipped with a mechanical stirrer and a return condenser is charged with 20 parts of an ethylene/carbon monoxide polymer having an average $C_2H_4/CO$ mole ratio of 1.7/1, 60 parts of urea, 10 parts of potassium carbonate, 200 parts by volume of 37% formalin, and 200 parts by volume of butanol. The mixture is heated to between 70° and 75° C., and maintained at this temperature for 30 hours. From the reaction mixture there is isolated 31 parts of a sponge-like resin, containing 62.4% carbon, 8.9% hydrogen, and 4.1% nitrogen, which corresponds to the reaction of about 33% of the α-hydrogen atoms per polymer unit. Objects molded from this resin at 200° C. are hard and tough.

*Example IV*

A reaction vessel fitted with a mechanical stirrer and a return condenser is charged with 10 parts of an ethylene/carbon monoxide polymer having a $C_2H_4/CO$ mole ratio of 2.4/1, 30 parts of urea, 5 parts of potassium carbonate, 100 parts by volume of 37% formalin, and 100 parts by volume of butanol. The reaction mixture is heated to between 70° and 75° C. and maintained at this temperature for 168 hours. It is then subjected to steam distillation, which separates the product into two portions, one soluble, the other insoluble in water. The latter is isolated by filtration and drying. In this way there are obtained 3.9 parts of a spongy material containing 65% carbon, 8.7% hydrogen, and 5.6% nitrogen, which corresponds to the introduction of one methylene group, arising from the formaldehyde, and one urea nucleus, per 5 polymer units.

Evaporation of the aqueous filtrate yields 30 parts of a dark-brown, hygroscopic solid which is soluble in acetic acid and water, insoluble in all other solvents. This product analyzes 33.7% carbon, 5.5% hydrogen, and 26.8% nitrogen.

*Example V*

A reaction vessel fitted with a mechanical stirrer is charged with 10 parts of an ethylene/carbon monoxide polymer having a $C_2H_4/CO$ mole ratio of 1.2/1, 100 parts by volume of 37% formalin, and 100 parts of isobutanol. The pH of this mixture is adjusted to 11.0 by the addition of aqueous sodium hydroxide. At the end of 48 hours, during which time the reaction mixture is stirred and maintained at 70° to 75° C., 30 parts of urea are added. Heating and agitation are continued for a total of 112 hours. Twenty parts of wood flour are added and the reaction is continued for 24 hours more. The product, isolated by evaporation of the reaction mixture to dryness, amounts to 84 parts of a light brown solid. Test specimens measuring 5" x ½" x ⅛", tested at 25° C. and 55% relative humidity in an Olson impact tester, have impact strengths of 0.34 and 0.28 foot pound per inch of notch.

*Example VI*

A reaction vessel equipped with a mechanical stirrer is charged with 10 parts of an ethylene/carbon monoxide polymer having a $C_2H_4/CO$ mole ratio of 1.5/1, 58 parts by volume of 37% formalin, 67.2 parts of phenol, and 100 parts by volume of isobutanol. The pH of the mixture is adjusted to 11 with aqueous sodium hydroxide and then heated for 120 hours at 70° to 75° C. The mixture is steam distilled and then acidified with hydrochloric acid. There is thus obtained 67.4 parts of a dark red, insoluble and infusible product containing 73.5% carbon and 6% hydrogen, which corresponds to the reaction of formaldehyde and phenol with about 63% of the polymer units.

*Example VII*

A reaction vessel fitted with a mechanical stirrer and a return condenser is charged with 10 parts of an ethylene/carbon monoxide polymer having a $C_2H_4/CO$ mole ratio of 2.3/1, 10 parts of diethylamine, and 100 parts by volume of 37% formalin. This mixture is agitated and heated under reflux for 10 hours. The product, isolated by steam distillation, followed by filtration and drying, amounts to 12 parts of a material containing 67.3% carbon, 9.6% hydrogen, and 0.2% nitrogen, which corresponds to the introduction of about 0.03 diethylaminomethyl groups per polymer unit. The product is soluble in boiling pyridine.

*Example VIII*

A reaction vessel equipped with a mechanical stirrer and a return condenser is charged with 20 parts of an ethylene/carbon monoxide polymer having a $C_2H_4/CO$ mole ratio of 1.32/1, 20 parts of freshly distilled furfural, 10 parts of potassium carbonate, 100 parts by volume of dioxane, and 100 parts of water. This mixture is agitated and heated under reflux for 20 hours. The product, isolated by steam distillation, followed by filtration and drying, amounts to 23.7 parts of a solid, insoluble, and infusible resin containing 72.4% carbon and 7.0% hydrogen, which corresponds to the reaction of 95% of the polymer units.

*Example IX*

A reaction vessel equipped with a mechanical stirrer and a return condenser is charged with 20 parts of an ethylene/carbon monoxide polymer having a $C_2H_4/CO$ mole ratio of 1.32/1, 20 parts of redistilled benzaldehyde, 10 parts of potassium carbonate, 100 parts by volume of dioxane, and 100 parts of water. This mixture is agitated and heated under reflux for 20 hours. The product, isolated by steam distillation, followed by filtration and drying, amounts to 21.2 parts of an insoluble and infusible resin containing 71.3% carbon and 7.9% hydrogen, which corresponds to the reaction of 13% of the polymer units.

As media for the reaction, any non-polymerizable, normally liquid compound may be used. The preferred reaction media are hydroxylic materials, e. g., water, methanol, ethanol, propanol, isopropanol, butanol, isobutanol, and cyclohexanol.

In place of the potassium carbonate and sodium hydroxide of the examples there can be used potassium hydroxide, calcium or barium hydroxides, sodium carbonate, sodium, calcium or barium bicarbonates, sodium or potassium borates, phosphates or acetates, tertiary amines, e. g., pyridine, quinoline, trimethyl and triethylamines.

The concentrations of reactants employed may be varied over a wide range. For example, the amount of aldehyde used may extend from about 1% to over 100% based on the weight of ethylene/carbon monoxide polymer. Similar proportions of urea, phenols, and amines may be employed. The quantity of catalyst should be sufficient to maintain the pH of the reaction medium in excess of .7 throughout the period of reaction. Generally, the amount of catalyst used varies from 0.1 to 50% on the weight of ethylene/carbon monoxide polymer.

In the practice of this invention any ethylene/carbon monoxide polymer prepared as described in co-pending application, Serial No. 449,765, filed July 4, 1942, can be used.

The invention may be operated over a wide range of temperatures, for example, from 25° C. to 150° C. It is not usually desirable to employ temperatures in excess of 150° C. Reaction at 25° C., however, is rather slow, so that in order to conduct the process at a reasonable rate, the preferred temperature range is from about 50° C. to 125° C.

Pressure may also be employed in the practice of this invention to accelerate the reaction, although its use is not necessary.

The synthetic resins obtained by the practice of this invention may be used in the preparation of cast and molded articles, as ingredients of lacquers and varnishes, as coating compositions for paper, leather, metal, cloth, etc., as impregnating agents for fabrics and textiles, as adhesives for wood, glass, paper, cloth, and leather, and in filled compositions containing such materials as wood flour, cotton, mica, chalk, lithopone, and the like. Such uses are especially valuable in view of the thermo-setting properties of these resins at elevated temperatures.

Various changes may be made in the details and preferred embodiments of this invention without departing therefrom or sacrificing the advantages thereof.

I claim:

1. The products obtained by reacting with an aldehyde substance the normally solid polymers obtained by polymerization of carbon monoxide with a polymerizable organic compound containing ethylenic unsaturation, the aldehyde-polymer reaction being carried on in the presence of an alkaline catalyst.

2. The products obtained by reacting with an aldehyde substance the normally solid polymers obtained by polymerization of carbon monoxide with a polymerizable organic compound containing ethylenic unsaturation, the aldehyde-polymer reaction being carried on at a temperature of from 25 to 150° C., and in the presence of an alkaline reagent catalyst.

3. The products obtained by reacting with an aldehyde substance the normally solid polymers obtained by polymerization of carbon monoxide with a polymerizable organic compound containing ethylenic unsaturation, the aldehyde-polymer reaction being carried on at a temperature of from 25 to 150° C., in the presence of an alkaline reagent catalyst, and in the presence of a non-polymerizable, normally liquid material.

4. The products obtained by reacting with formaldehyde, in the presence of an alkaline reagent catalyst, the normally solid polymers obtained by polymerization of carbon monoxide with a polymerizable organic compound containing ethylenic unsaturation.

5. The products obtained by reacting with formaldehyde the normally solid polymers obtained by polymerization of carbon monoxide with a polymerizable organic compound containing ethylenic unsaturation, the formaldehyde-polymer reaction being carried on at a temperature of from 25° to 150° C. and in the presence of an alkaline reagent catalyst.

6. The products obtained by reacting with formaldehyde the normally solid polymers obtained by polymerization of carbon monoxide with a polymerizable organic compound containing ethylenic unsaturation, the formaldehyde-polymer reaction being carried on at a temperature of from 25° to 150° C., in the presence of an alkaline reagent catalyst, and a non-polymerizable, normally liquid compound.

7. The products obtained by reacting with formaldehyde, in the presence of an alkaline reagent catalyst, the normally solid polymer obtained by polymerization of carbon monoxide with ethylene.

8. The products obtained by reacting with formaldehyde the normally solid polymer obtained by polymerization of carbon monoxide with ethylene, the formaldehyde-polymer reaction being carried on at a temperature of from 25° to 150° C., and in the presence of an alkaline reagent catalyst.

9. The products obtained by reacting with formaldehyde the normally solid polymer obtained by polymerization of carbon monoxide with ethylene, the formaldehyde-polymer reaction being carried on at a temperature of from 25° to 150° C., in the presence of an alkaline reagent catalyst, and a non-polymerizable normally liquid compound.

WILLIAM EDWARD HANFORD.